(12) United States Patent
Michirura et al.

(10) Patent No.: US 6,217,414 B1
(45) Date of Patent: Apr. 17, 2001

(54) METHOD AND APPARATUS FOR REPOSITIONING AND FORMING A POWER TRANSMISSION BELT

(75) Inventors: Hiromi Michirura, Akashi; Shinji Kotani, Hyogo, both of (JP)

(73) Assignee: Mitsuboshi Belting Ltd., Hyogo (JP)

( * ) Notice: Subject to any disclaimer, the term of this patent is extended or adjusted under 35 U.S.C. 154(b) by 0 days.

(21) Appl. No.: 09/320,040

(22) Filed: May 26, 1999

(30) Foreign Application Priority Data

May 26, 1998 (JP) .................................................. 10-144689

(51) Int. Cl.[7] ...................................................... B24B 1/00
(52) U.S. Cl. ........................... 451/28; 451/296; 451/302; 451/307
(58) Field of Search ........................... 451/8, 5, 9, 28.51, 451/296, 302, 307, 308, 309, 331, 332, 333, 336, 337, 339, 364, 401, 403

(56) References Cited

U.S. PATENT DOCUMENTS

| 4,505,073 | 3/1985 | Tomiyori et al. . |
| 4,793,057 | 12/1988 | Kamiyama et al. . |
| 5,549,510 | 8/1996 | Fukuda et al. . |

FOREIGN PATENT DOCUMENTS

09076364A * 3/1997 (JP) .

* cited by examiner

*Primary Examiner*—Derris H. Banks
(74) *Attorney, Agent, or Firm*—Wood, Phillips, VanSanten, Clark & Mortimer (57) ABSTRACT

An apparatus for repositioning and forming a power transmission belt. The apparatus has first and second hangers for supporting a plurality of power transmission belts and movable selectively between active and inactive positions. Each of the first and second hangers has a storage portion and a standby portion. At least one shifting mechanism is operable to move a power transmission belt from the storage portion to the standby portion on each of the first and second hangers. A first belt running unit has a first pulley around which a power transmission belt can be placed. The first belt running unit is movable selectively between a processing position and an attaching/detaching position. A second belt running unit has a second pulley around which a power transmission belt can be placed. The second belt running unit is movable selectively between a processing position and an attaching/detaching position. At least one belt transfer assembly is operable to move a power transmission belt at the standby portion on one of the first and second hangers that is in the active position for the one of the first and second hangers to around one of the first and second pulleys with the belt running unit having the one of the first and second pulleys located in the attaching/detaching position therefor. A processing assembly forms a part of the power transmission belt placed around one of the first and second pulleys.

35 Claims, 7 Drawing Sheets

METHOD AND APPARATUS FOR RESPOSITIONING AND FORMING A POWER TRANSMISSION BELT

BACKGROUND OF THE INVENTION

1. Field of the Invention

This invention relates to power transmission belts and, more particularly, to a method and apparatus for placing a power transmission belt to be processed around spaced pulleys for movement in an endless path, performing a process on the power transmission belt as it moves in the endless path, removing the power transmission belt after completing processing thereof, and directing the processed power transmission belt to a storage location.

2. Background Art

It is known to manufacture power transmission V-belts by applying various layers and components onto a support to form a cylindrical sleeve, cutting the sleeve to form individual belts each with a trapezoidal cross-sectional shape, and thereafter vulcanizing the belts. Alternatively, the sleeve can be vulcanized and thereafter cut to produce individual belts.

The resulting V-belts may vary in length and cross-sectional shape as a result of thermal contraction of the components, displacement of load carrying cords within the belts, and machining errors. In the event of a dimensional variation, the seating of a belt in a cooperating pulley may change from that desired. This may result in a variation in the tension on the belt in the system in which it is operated and potentially vibration of the belt in use, which vibration may be induced to the equipment on which it is operated.

Accordingly, belts are commonly inspected and often are rejected due to improper formation. Typically, belts will be classified as acceptable if they have a length that falls within a predetermined range. A sizing reel is commonly used to make the distinction between an acceptable belt and a rejected belt. A rejected belt may be converted into an acceptable belt by polishing the pulley-engaging side surfaces on the belt.

In another belt forming process, belt components are reversely applied on a mandrel to define a sleeve, which is vulcanized. An abrasive element is used to cut the sleeve while rotating the mandrel, to thereby produce individual V-belts. An exemplary cutter for separating the individual V-belts from the sleeve is shown in U.S. Pat. No. 3,818,576, with an exemplary apparatus for effecting the cutting operation disclosed in U.S. Pat. No. 3,711,996.

Another manner of forming V-belts is shown in JP-B-4-2425. There is disclosed therein an apparatus having drive and driven pulleys around which a belt is placed and moved in an endless path. Rotatable cutting blades cut the pulley-engaging side faces of the belt. A stabilizing roller acts against a surface of the belt to avoid unwanted belt shifting during the side cutting operation.

In this type of system, efficiency is an important goal. In operation, a belt is placed around the drive and driven pulleys, the stabilizing roller is brought into contact with the belt, the cutting blades are used to form the belt side surfaces, and the formed belt is removed and replaced by another belt. The time period between the removal of the completed belt and the substitution thereon of another belt to be formed may be substantial and represents wasted processing "down time".

SUMMARY OF THE INVENTION

The invention is directed to an apparatus for repositioning and forming a power transmission belt. The apparatus has first and second hangers for supporting a plurality of power transmission belts and movable selectively between active and inactive positions. Each of the first and second hangers has a storage portion and a standby portion. At least one shifting mechanism is operable to move a power transmission belt from the storage portion to the standby portion on each of the first and second hangers. A first belt running unit has a first pulley around which a power transmission belt can be placed. The first belt running unit is movable selectively between a processing position and an attaching/detaching position. A second belt running unit has a second pulley around which a power transmission belt can be placed. The second belt running unit is movable selectively between a processing position and an attaching/detaching position. At least one belt transfer assembly is operable to move a power transmission belt at the standby portion on one of the first and second hangers that is in the active position for the one of the first and second hangers to around one of the first and second pulleys with the belt running unit having the one of the first and second pulleys located in the attaching/detaching position therefor. A processing assembly forms a part of the power transmission belt placed around one of the first and second pulleys.

The apparatus may further include a storage assembly for collecting power transmission belts after forming by the processing assembly.

At least one belt transfer assembly may be provided to move power transmission belts after forming by the processing assembly to the storage assembly.

A third pulley may be provided around which a power transmission belt placed around one of the first and second pulleys can be simultaneously placed with the belt running unit having the one of the first and second pulleys located in the processing position therefor.

At least one of the first pulley and the third pulley is movable relative to the other of the first pulley and the third pulley to adjust tension on a power transmission belt placed around the first and third pulleys.

The first and second hangers may be carried on a frame, with the frame being movable around a first axis to selectively change the first and second hangers between the active and inactive positions therefor.

The first and second hangers may project in cantilever fashion from the frame.

A drive may be operable to move the frame around the first axis.

In one form, the at least one belt transfer assembly is operable to move a power transmission belt in paths along multiple axes.

The apparatus may further include a plurality of power transmission belts with pulley-engaging sides arranged in side-to-side relationship surrounding the first hanger, with the at least one shifting mechanism including a pusher element which is engageable with one of the power transmission belts and movable to cause the one of the power transmission belts to move another power transmission belt surrounding the first hanger from the storage portion to the standby portion.

The belt running units may each be pivotable between the processing and attaching/detaching positions therefor.

The processing assembly may include a polishing element for polishing a surface of a power transmission belt.

A drive may be operable to cause a power transmission belt placed around the first pulley to move in an endless path while being formed by the processing assembly.

In one form, the first hanger has a stabilizing element thereon defining first and second spaced edges for supporting a power transmission belt surrounding and supported on the first hanger.

The stabilizing element may have a C shape in cross section.

The at least one shifting mechanism may have a pusher element that is movable in first and second transverse paths.

In one form, the belt transfer assembly has first and second jaws that are movable selectively towards and away from each other to selectively grip and release a power transmission belt.

The jaws may be movable along three transverse axes.

The apparatus may further include a conduit for directing a supply of pressurized air against a power transmission belt placed around the first pulley with the first belt running unit in the processing position for the first belt running unit.

A drive may be provided for moving the first belt running unit pivotably through 90° between the processing and attaching/detaching positions for the first belt running unit.

The apparatus may further include a shield plate having a vertically extending surface adjacent a power transmission belt placed around the first pulley with the first belt running unit in the processing position for the first belt running unit to thereby reduce vibration of a power transmission belt moving in an endless path around the first pulley.

The storage assembly may include a plate with a first rod projecting from the plate and around which power transmission belts can be placed.

The storage assembly may include a second rod projecting from the plate and around which transmission belts can be placed.

In one form, the plate and first rod are movable together around an axis.

The invention is also directed to an apparatus for repositioning and forming a power transmission belt having a first belt running unit with a first pulley around which a power transmission belt can be placed, with the first belt running unit being movable selectively between a processing position and an attaching/detaching position. A second belt running unit has a second pulley around which a power transmission belt can be placed. The second belt running unit is movable selectively between a processing position and an attaching/detaching position. At least one belt transfer assembly is operable to move a power transmission belt to around one of the first and second pulleys with the belt running unit having the one of the first and second pulleys located at the attaching/detaching position therefor. A processing assembly performs a processing step on a power transmission belt a) placed around the first pulley with the first belt running unit in the processing position for the first belt running unit and b) placed around the second pulley with the second belt running unit in the processing position for the second belt running unit. With the first belt running unit in the processing position for the first belt running unit and the second belt running unit in the attaching/detaching position for the second belt running unit, the processing assembly can perform a processing step on a power transmission belt placed around the first pulley, whereby upon completion of the processing step on the power transmission belt placed around the first pulley, the first belt running unit can be moved to the attaching/detaching position for the first belt running unit and the second belt running unit can be moved to the processing position for the second belt running unit to allow the processing assembly to perform a processing step on a power transmission belt placed around the second pulley.

The apparatus may include a third pulley. A power transmission belt can be simultaneously placed around the first and third pulleys with the first belt running unit in the processing position therefor.

At least one of the first pulley and third pulley is movable relative to the other of the first pulley and the third pulley to adjust tension on a power transmission belt placed around the first and third pulleys.

The apparatus may further include a belt transfer assembly which is operable to move a power transmission belt to around the first pulley.

The belt transfer assembly may be operable to move a power transmission belt from around the first pulley.

The processing assembly may include a polishing element for operating on a surface of a power transmission belt.

The invention is also directed to an apparatus for repositioning and forming a power transmission belt having first and second hangers for supporting a plurality of power transmission belts. The first and second hangers are mounted to a frame for rotation around a first axis to selectively place each of the first and second hangers in active and inactive positions. Each of the first and second hangers has a storage portion and a standby portion. The drive is operable to move the frame around the first axis. At least one shifting mechanism is operable to move a power transmission belt at the storage portion to the standby portion on each of the first and second hangers. A first belt running unit has a first pulley around which a power transmission belt can be placed, with the first belt running unit being movable selectively between a processing position and an attaching/detaching position. A second belt running unit has a second pulley around which a power transmission belt can be placed, with the second belt running unit being movable selectively between a processing position and an attaching/detaching position. At least one belt transfer assembly is operable to move a power transmission belt at the standby portion on each of the first and second hangers that is in the active position for the one of the first and second hangers to around one of the first and second pulleys with the belt running unit having the one of the first and second pulleys located in the processing position therefor. The at least one belt transfer assembly is capable of moving a power transmission belt along multiple transverse axes. A drive is operable to move each of the first and second belt running units between the processing and attaching/detaching positions therefor. A processing assembly is provided for forming a part of a power transmission belt placed around one of the first and second pulleys. A storage assembly is provided for collecting power transmission belts after forming by the processing assembly.

The first and second belt running units may each be pivotable between the processing and attaching/detaching positions therefor.

The invention is also directed to a method of repositioning and forming a power transmission belt including the steps of storing a plurality of power transmission belts on a first hanger, transferring a first power transmission belt from the first hanger to around a first pulley on a first belt running unit situated in a processing position, moving the first power transmission belt around the first pulley, as the first power transmission belt is moved around the first pulley performing a processing step on the first power transmission belt through a first processing assembly, repositioning the first belt running unit from the processing position into an attaching/detaching position, transferring the first power transmission belt from around the first pulley to a storage location after performing the processing step, with the first belt running unit in the attaching/detaching position moving a second belt running unit with a second pulley and a second power transmission belt placed around the second pulley from an attaching/detaching position for the second belt running unit to a processing position for the second belt running unit, with the second belt running unit in the processing position for the second belt running unit moving the second power transmission belt in an endless path around the second pulley, performing a processing step on the second power transmission belt through the first processing assembly with the second power transmission belt moving around the second pulley, repositioning the second belt running unit from the processing position for the second belt running unit into the attaching/detaching position for the second belt running unit, placing a third power transmission belt from around the first hanger to around the first pulley, and repositioning the first belt running unit with the third power transmission belt around the first pulley to the processing position for the first belt running unit to allow performance of a processing step on the third power transmission belt.

The method may further include the steps of providing a second hanger and moving the first and second hangers selectively from an inactive position to an active position from where the power transmission belts on the first and second hangers can be transferred to the first and second pulleys.

The method may include the steps of shifting a plurality of power transmission belts on the first hanger to move individual power transmission belts from a storage portion on the first hanger to a standby portion on the first hanger.

Through the present invention, an apparatus may be provided to efficiently, serially move power transmission belts and effect processing thereof.

DETAILED DESCRIPTION OF THE DRAWINGS

An apparatus for repositioning and forming a power transmission belt 9, according to the present invention, is shown at 10. The apparatus 10 consists of a belt hanger assembly at 12 on which a plurality of power transmission belts 9 can be supported. A belt shifting assembly 14 repositions the belts 9 stored on the belt hanger assembly 12 so as to facilitate pickup thereof by a belt transfer assembly 16. The belt transfer assembly 16 moves the belts 9 one-by-one from the belt hanger assembly 12 to an operative position on either of first and second belt running units 18, 20. The belt running units 18, 20 alternately move a belt 9 operatively mounted thereon to a processing assembly 22 at which a processing step is performed on the belt 9. Upon completion of the processing step, belts 9 from the belt running units 18, 20 are transferred to a storage assembly at 24. Below is a detailed description of the various components described above and their interaction.

The belt hanger assembly 12 consists of a ring-shaped frame element 26 which is attached to a main frame 28 on the apparatus 10 for pivoting movement around a horizontally extending axis 30. A shaft 32 which pivotably supports the frame element 26 is driven by a motor 34.

In this embodiment, the hanger assembly 12 has six cantilevered hangers 36 projecting from the frame element 26 substantially parallel to the axis 30 and spaced equidistantly around the frame element 26. The motor 34 controllably drives the frame element 26 through increments of 60° to serially place the hangers 36 in an active position, as shown for the hanger 36 at position A in FIGS. 5 and 6. The remaining hangers 36 are in an inactive position. With one of the hangers 36 in the active position, a pin 38 is projected by operation of a cylinder 40 into a receptacle 42 on a holding element 44 on the frame element 26. There are six such holding elements 44 spaced equidistantly around the frame element 26 with the receptacle 42 on one holding element 44 aligning over the pin 38 with each of the hangers 36 in the active position. This positively and consistently holds the frame element 26 in the desired angular position.

Figure 5:
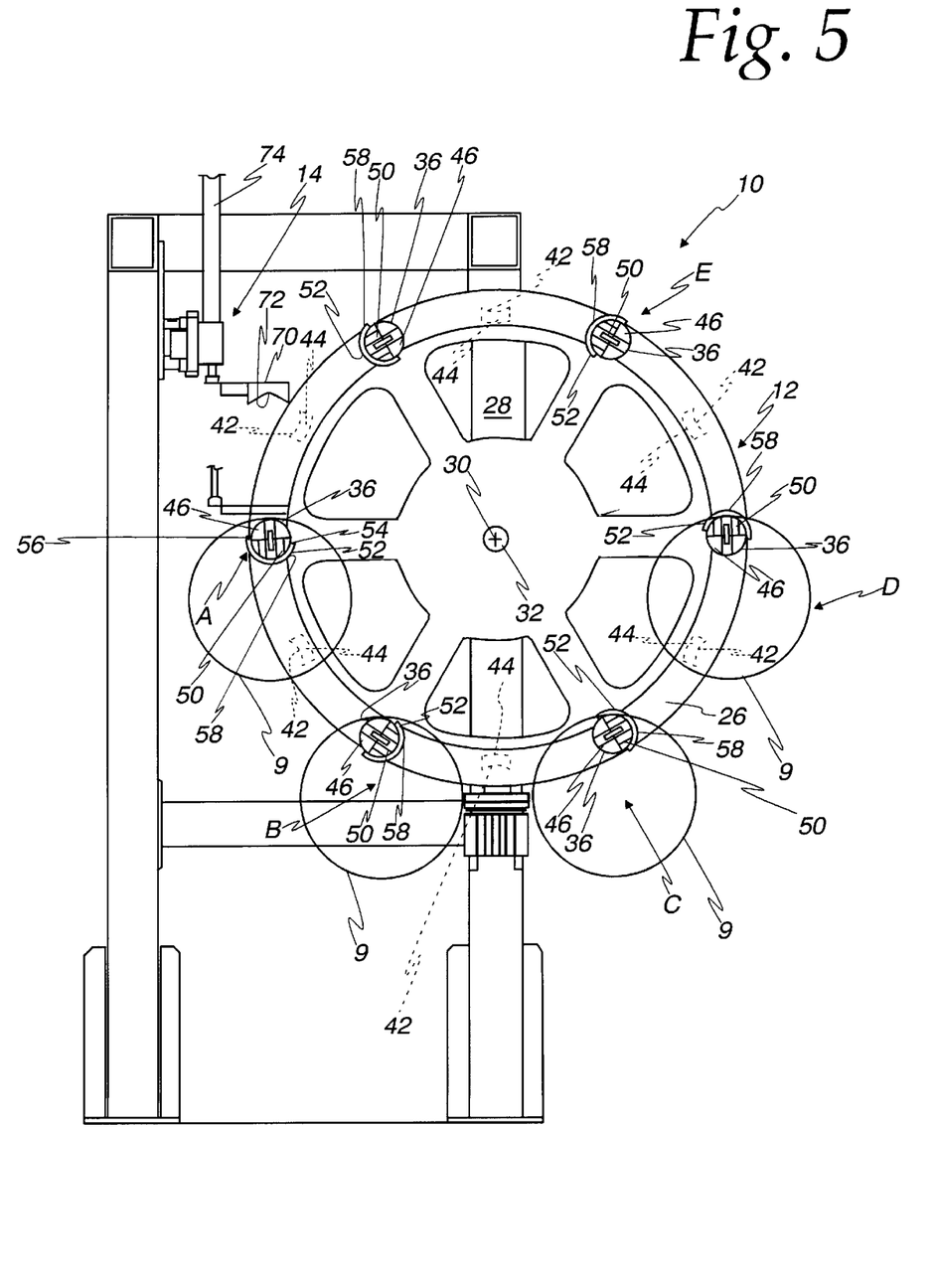
FIG. 5 is an enlarged, elevation view of a hanger assembly on the inventive apparatus for storing a plurality of power transmission belts and taken from the perspective of line B—B of FIG. 1.
Figure 6:
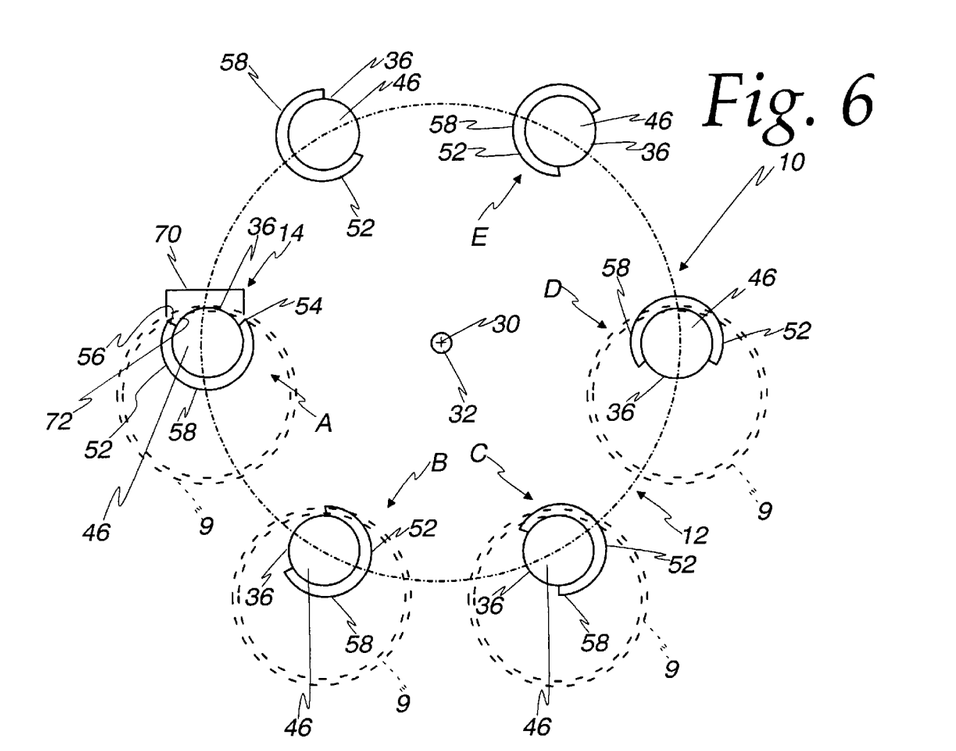
FIG. 6 is an enlarged view of the hanger assembly as in FIG. 5 and showing a frame and hangers on the frame.
Figure 7:
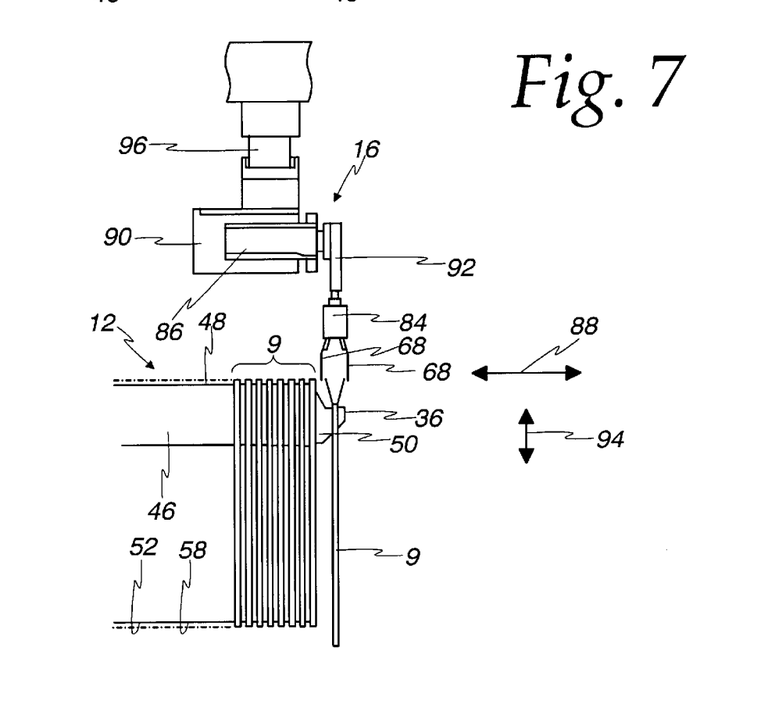
FIG. 7 is an enlarged, fragmentary, elevation view of a belt transfer assembly on the inventive apparatus, taken from the perspective in FIG. 1, with an individual belt being picked up from one of the hangers on the hanger assembly.

Each hanger 36 has an elongate body 46 around which a plurality of belts 9 can be placed in side-by-side relationship. Each hanger 36 has a storage portion 48 extending from the frame element 26 to a standby portion at 50 at the free end thereof. Each hanger 36 has an associated stabilizing element 52 which has a C shape in cross section with spaced free edges 54, 56 for simultaneously engaging and supporting a power transmission belt 9 with the hanger 36 in the active position A, as shown in FIGS. 5 and 6. The belts 9 engage and are guided by the outer surface 58 of the stabilizing elements 52 through each of the three inactive positions, as shown at B, C and D in FIG. 6. The position D, which is diametrically opposite to the position A, is the position at which the belts 9 are preferably placed on the hangers 36. In the position D, the stabilizing element 52 opens downwardly and oppositely to the direction of opening in position A.

Figure 8:
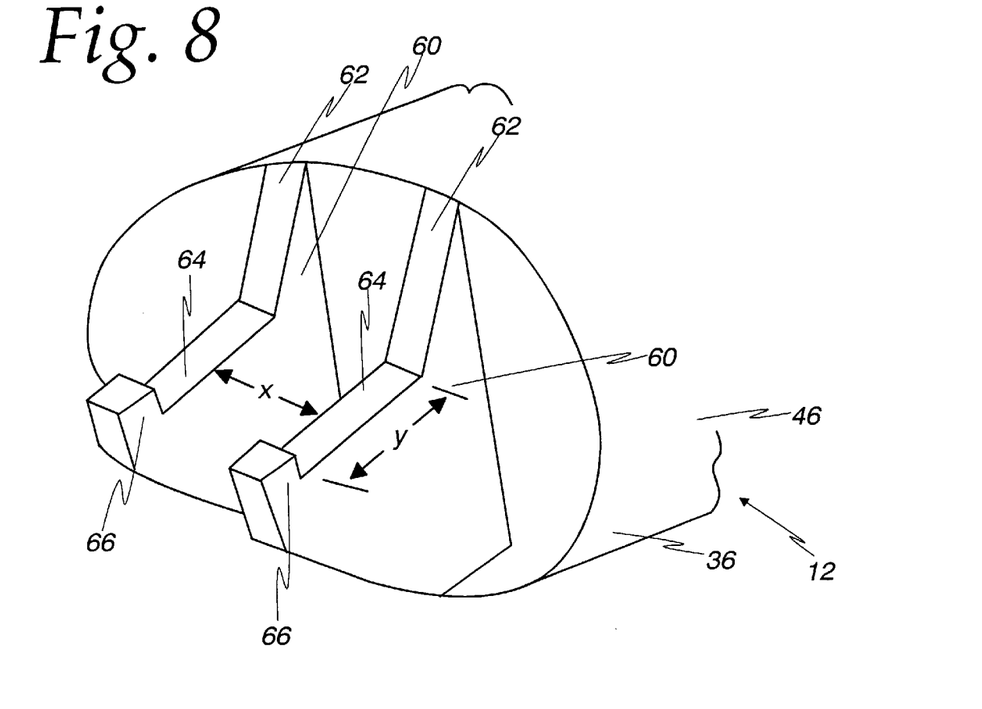
FIG. 8 is an enlarged, fragmentary, perspective view of an end of one of the hangers on the hanger assembly on the inventive apparatus to facilitate picking up of individual belts by the transfer assembly in FIG. 7.

At the free end of each hanger 36, as seen most clearly in FIG. 8, there are two similarly configured plates 60. Each plate 60 has a downwardly inclined surface 62 which terminates at a horizontally extending surface 64. A stop 66 is located at the end of the surface 64 remote from the surface 62. The plates 60 are spaced by a distance X, which is sufficient to allow movement therebetween of a pair of gripping jaws 68 on the belt transfer assembly 16, as hereinafter described. Individual belts 9 shifted towards the free end of each hanger 36 initially encounter the surfaces 62 and are guided under their own weight thereover towards and against the surfaces 64 to be cooperatively supported thereby. The movement along the surfaces 64 is arrested by the stops 66. The dimension Y of the surfaces 64 is sufficient to stably support a single belt 9 in a standby position. The height of the stoppers 66 and surfaces 62 is selected so that belts 9 in the standby position are stably held and not inclined to inadvertently separate from the standby portion 50.

A single plate 60 could be utilized on the standby portion 50. However, the single plate 60 may not stably support the belts 9 and also requires a different pickup mechanism on the transfer assembly 16, which may be required to be more complicated than that shown. Additionally, the belt 9 in the standby position supported upon a single plate 60 may tend to pivot undesirably around a vertical axis relative to the plate 60, which may orient the belt 9 so that it is difficult to pick up with the belt transfer assembly 16.

The belt shifting assembly 14 is responsible for shifting the belts 9 on the storage portions 48 of the hangers 36 towards and to the standby portions 50. The belt shifting assembly 14 consists of a pusher element 70 with an inverted V-shaped edge 72 which is designed to straddle the pusher body 46 that is in the active position, as shown in FIG. 6. The pusher element 70 is movable selectively in transverse, horizontal and vertical paths corresponding to X and Y axes. A cylinder 74 is operable to raise and lower the pusher element 70 relative to the hanger 36 in the active position. The pusher element 70 is moved horizontally along the length of the hanger body 46 by a base 76 fitted to a ball screw 78 on rails 80. The cylinder 74 is attached to move with the base 76. Horizontal movement of the pusher element is effected by rotating the ball screw 78 through a servo motor 82.

By lowering the pusher element 70, the pusher element 70 moves between the free edges 54, 56 of the stabilizing element 52. By then operating the motor 82 the belt 9 in the belt supply closest to the main frame 28 is engaged by the pusher element 72 and advanced towards the free end of the hanger 36 in the active position. The servo motor 82 operates to incrementally shift the pusher element each time an amount corresponding to the width of a single belt 9 so that belts 9 fall one-by-one into the standby position around the standby portion 50.

On the belt transfer assembly 16, the gripping jaws 68 are movable towards and away from each other to selectively grip and release a belt 9. Movement of the jaws 68 is effected through a chuck 84. A cylinder 86 is operable to move the jaws 68 in the line of the double-headed arrow 88, along the X axis, generally parallel to the length of the hangers 36 to move a belt 9 from the standby position towards the belt running units 18, 20. A separate cylinder 90 moves the cylinder 86, and thus the jaws 68, in the line of the double-headed arrow 88. A cylinder 92 is operable to move the jaws 68 vertically in the line of the double-headed arrow 94, along the Z axis. A separate cylinder 96, which may be a rodless cylinder, is operable to move the cylinders 86, 90, 92, and thus the jaws 68, along the Y axis, in a third line which is perpendicular to a plane containing the lines 88, 94.

The cylinder 90 moves the cylinders 86, 92 along the line of the double-headed arrow 88 (along the X axis), with the cylinder 96 effecting movement of the cylinders 86, 90, 92 along the Y axis. This, coupled with the movement of the jaws along the Z axis by the cylinder 92, permits the gripping jaws 68 to be movable in three orthogonal lines along the X, Y, and Z axes.

The belt running units 18, 20 have a similar construction, with the belt running unit 18 described hereinbelow. Corresponding elements on the belt running unit 20 are identified with like numbers and a "'" designation. The belt running unit 18 has a fixed drive pulley 98 and a driven pulley 100 which are rotatable about parallel axes. The driven pulley 100 is movable by a cylinder 101 relative to the drive pulley 98 guidingly along a vertical rod 102 to thereby vary the tension on a belt 9 placed around the drive and driven pulleys 98, 100. The drive pulley 98 is rotated by a motor 104, on a base 106, through a transmission belt 108 to move belts 9 placed around the pulleys 98, 100 in an endless path.

Figure 9:
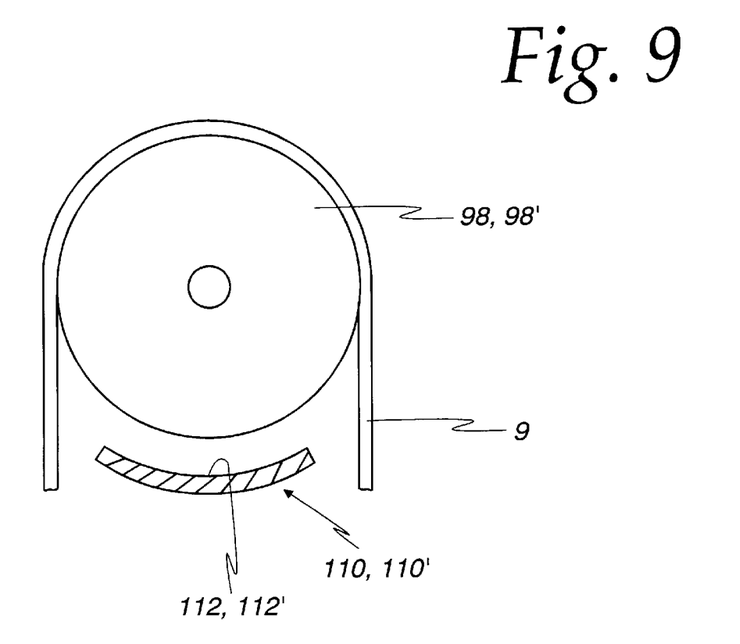
FIG. 9 is an enlarged, fragmentary, elevation view taken from the perspective in FIG. 2 and showing a belt placed upon a pulley on the inventive apparatus so as to be driven in an endless path for processing by the processing assembly and with a guide plate situated in a retracted position.
Figure 10:
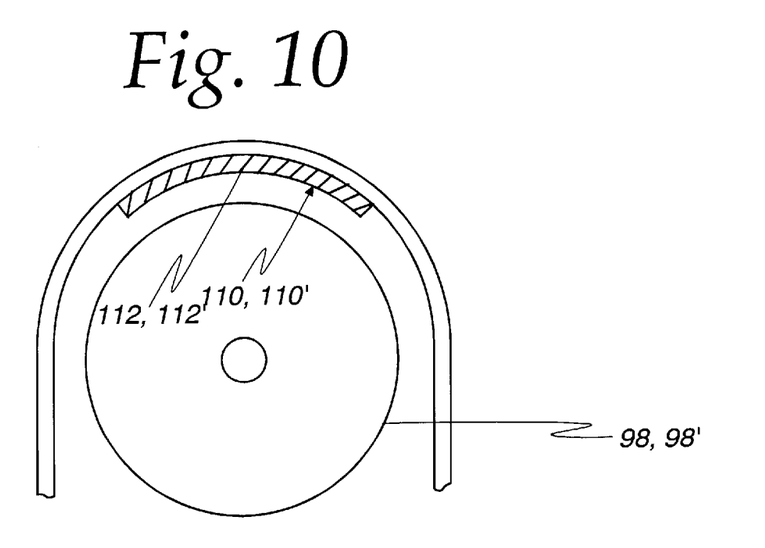
FIG. 10 is a view as in FIG. 9 with the guide plate moved to an extended position to facilitate removal of a belt from the pulley by the belt transfer assembly.
Figure 11:
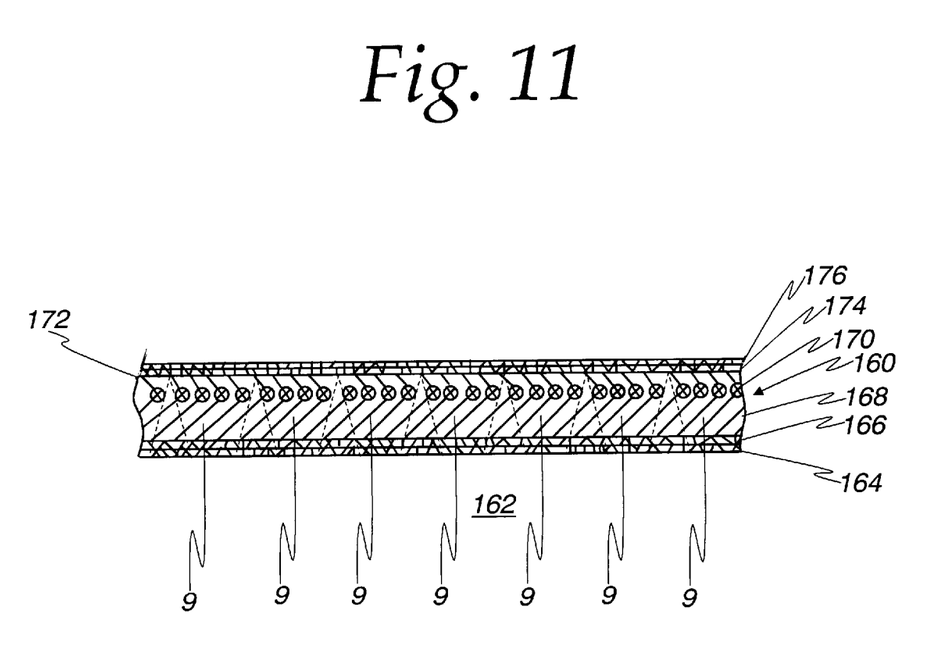
FIG. 11 is an enlarged, fragmentary cross-sectional view of a portion of an exemplary power transmission belt sleeve and identifying the shape of individual belts to be cut from the sleeve of the type that can be processed using the inventive apparatus.

A belt separating device at 110 has a guide plate 112 which is pivotable between an extended position, as shown in FIG. 11, and a retracted position, shown in FIG. 9. In the retracted position for the guide plate 112, a belt 9 is allowed to directly engage the drive pulley 98. Rotation of the guide plate 112, through 180° to the extended position, causes the belt 9 to be separated from the drive pulley 98 to facilitate pickup by the belt transfer assembly 16, as hereinafter described.

The belt running unit 18 is pivotable about a vertical axis 116 between a processing position, as shown at A, and an attaching/detaching position, shown at B. Pivoting is guided by a shaft 118 within a bearing 120 on the base 106.

Pivoting motion is imparted to the belt running unit 18 by a pivoting assembly 122. The pivoting assembly 122 includes a cylinder 124 having an extendable rod 126. The cylinder 124 is pivotably attached to the main frame 28, with the free end of the rod 126 pivotably attached to the base 106. Extension and retraction of the cylinder rod 126 pivots the belt running unit 18 through a 90° range between the processing position and the attaching/detaching position.

Preferably, the movement of the belt running units 18, 20 is synchronized so that with the belt running unit 18 in the processing position, the belt running unit 20 is in the attaching/detaching position, and vice versa. With the belt running unit 18, 20 in the processing position therefor, a belt 9 placed around the pulleys 98, 100; 98', 100' can be processed by the processing assembly 22, as hereinafter described. With the belt running units 18, 20 in the attaching/detaching position therefor, belts 9 can be placed around the pulleys 98, 100; 98', 100' and removed therefrom by the belt transfer assembly 16, as also described below.

With this arrangement, potentially the movement of the belt running units 18, 20 can be coordinated so that the only significant down time is that time period during which one of the belt running units 18, 20 is moved out of the processing position therefor and the other belt running unit 18, 20 is moved from the attaching/detaching position into the processing position therefor. With a single belt running unit, no processing step is performed during the entire time period that the belt that is processed is removed and another belt is substituted and thereafter repositioned operatively in association with a processing assembly.

The processing assembly 22 in this case is operated to polish side surfaces of a belt. The invention contemplates that other processing steps could be performed on the belts to effect forming thereof.

The processing assembly 22 consists of two processing units 128, 130, which are essentially the same in construction. The processing unit 128 will be described herein with corresponding parts on the processing unit 130 being identified with a like number and a "'" designation.

The processing unit 128 consists of a polishing element 132, which in this case is sanding paper in an endless belt form trained around a drive shaft 134 and a driven shaft 36. The shafts 134,136 are rotatable in bearings 138, 140, respectively.

The bearing 140 is supported on a table 142. A motor 144 is likewise mounted upon the table 142 and imparts rotation to the shaft 134 through a step-up gear assembly 146.

Figure 1:
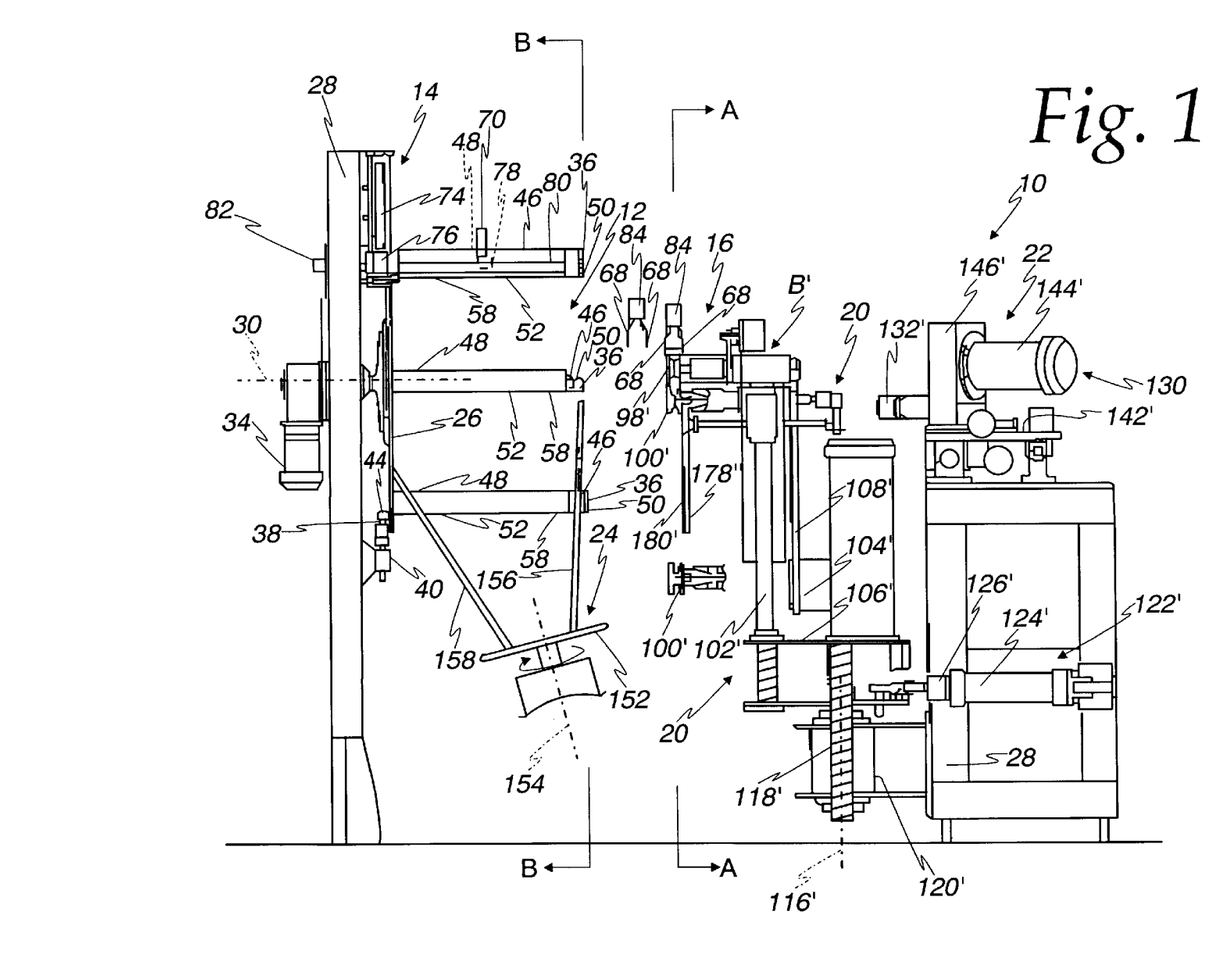
FIG. 1 is an elevation view of an apparatus for repositioning and forming a power transmission belt, according to the present invention.
Figure 2:
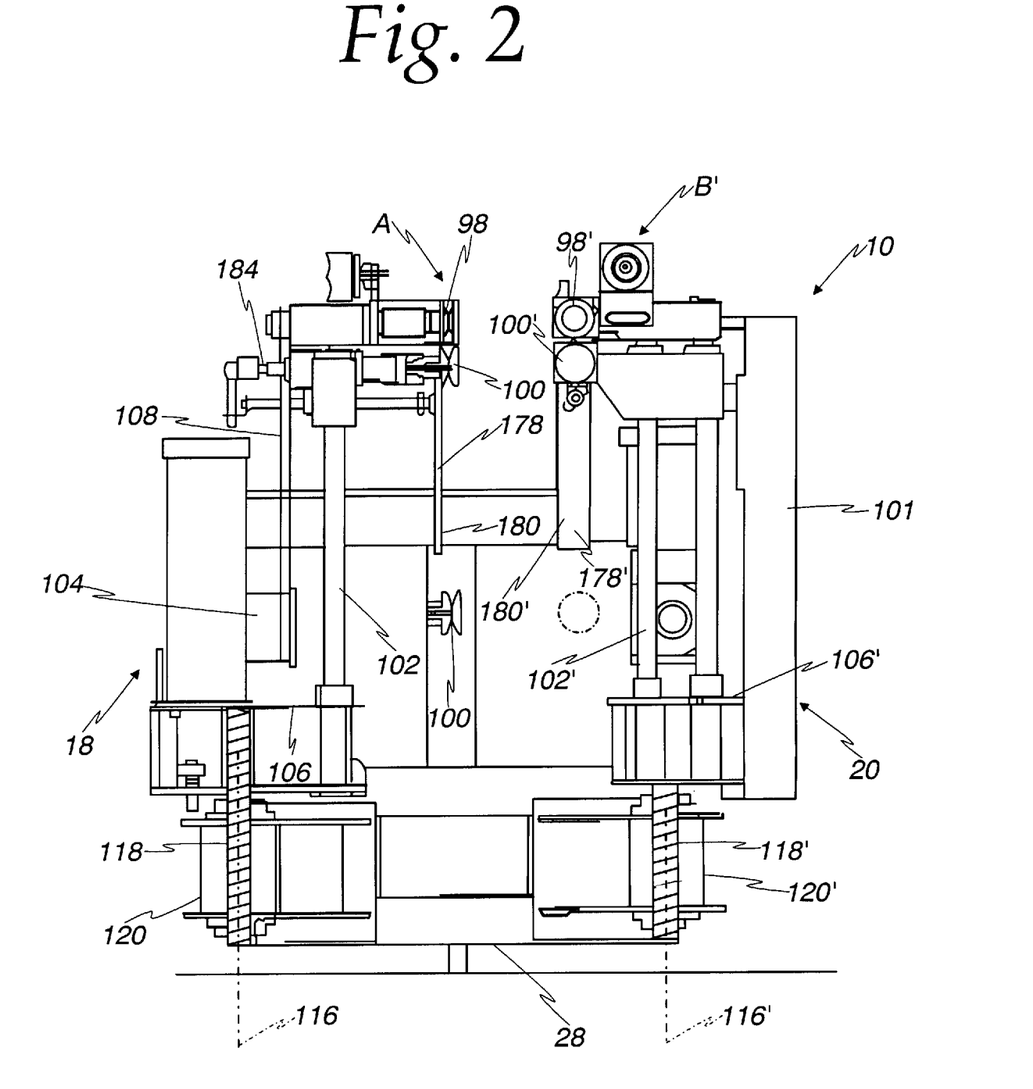
FIG. 2 is an elevation view of the inventive apparatus from the perspective of line A—A in FIG. 1.
Figure 3:
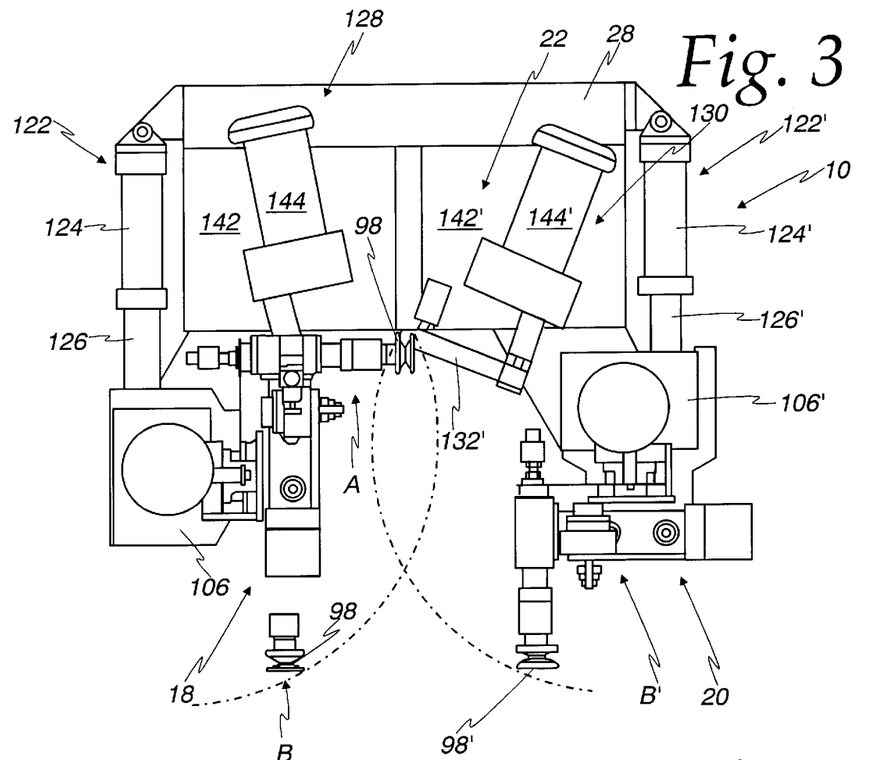
FIG. 3 is a plan view of the inventive apparatus in FIGS. 1 and 2.
Figure 4:
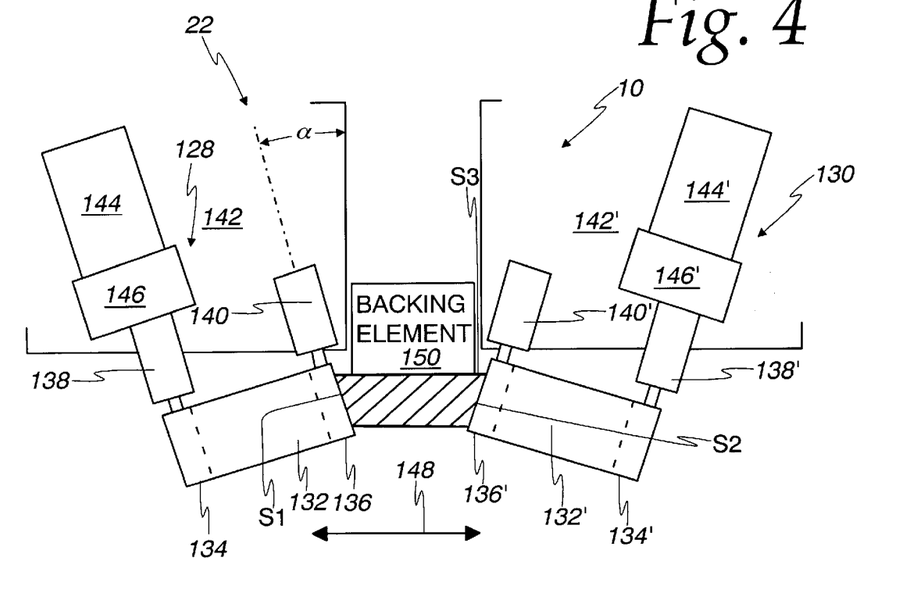
FIG. 4 is a fragmentary, plan view of a processing assembly on the inventive apparatus for performing a processing step on a power transmission belt.

The table 142 is movable relative to the main frame 28 in a reciprocating, linear path, as indicated by the double-headed arrow 148 in FIG. 4. By moving the table 142 in the line of the arrow 148, the sanding belt 132 can be moved selectively towards and away from one of the side surfaces S1 on a belt mounted on one of the belt running units 18, 20 that is in the processing position. The sanding belt 132' is likewise movable towards and away from the other belt side S2.

It is possible to vary the angle a which the sanding belt 132 makes with a belt side S1. This can be accomplished by incorporating arcuate guide structure between the motor 144 and table 142.

An optional backing element 50, which may be in the form of a push roll, is provided to abut an outside surface S3 of a belt 9 being operated upon by the processing units 128, 130. This potentially permits more positive positioning of a belt 9 and more accurate processing thereon.

The belt storage assembly 24 consists of a plate 152 that is rotatable about an axis 154. The plate has first and second rods 156, 158 projecting angularly upwardly from the plate 152. It is intended that the completed belts 9 be placed over one of the rods 156, 158 for collection. The completed belts are 9 moved by the belt transfer assembly 16 from the belt running units 18, 20 to one of the rods 156. After a predetermined number of belts are accumulated on the one rod 156, the plate 152 can be rotated to place the other rod 158 in position to accept additional belts. In so doing, the rod 156 is conveniently located to remove the belts 9 accumulated therearound.

An exemplary belt sleeve, that can be used to make belts 9 for processing on the apparatus 10, is shown at 160 in FIG. 11. Individual components are wrapped serially around a forming drum 162. The first two components applied over the forming drum 162 are extensible canvas layers 164, 166. The canvas may be biased canvas with good extensibility and warp and weft yarns intersecting at angles of 90–155° with respect to the circumference of the drum i.e. in the longitudinal direction of the belts. A rubber layer 168 is wrapped over the canvas layer 166. Load carrying cords 170 are spirally wrapped around the rubber layer 168. The load carrying cords 170 preferably have high strength with low elongation. As an example, the load carrying cords 170 may be made with polyester fiber. An additional rubber layer 172, that is thinner than the rubber layer 168, is wrapped over the load carrying cords 170. One, or multiple, and in this case two, plies 174, 176 of extensible canvas are provided over the rubber layer 172. Optional, short, reinforcing fibers may be embedded in the rubber layers 168, 172 with lengths thereof oriented parallel to the width of the belt. Suitable fibers may be made from cotton, nylon, aramid, or the like.

The resulting sleeve 160 may be vulcanized using a well known pressing and heating process. The vulcanized sleeve 160 is then cut to produce individual belts 9 having a trapezoidal shape. This may be accomplished by using a cutter without a mandrel. Through the apparatus 10, the sides S1, S2 of the individual belts can be polished to precisely form the belt shape.

The overall operation of the apparatus 10 will now be described. A plurality of the belts 9 are placed on the hanger 36 located at the D position in FIGS. 5 and 6. The frame element 26 is then rotated to situate the adjacent hanger 36 at the E position into the D position for loading of additional belts thereupon. The operation is repeated so that there are belts 9 on four of the hangers 36 as shown at positions A, B, C and D in FIGS. 5 and 6.

The pusher element 70 is lowered to the hanger 36 at the A position by operation of the cylinder 74 to reside between the edges 54, 56 on the stabilizing element 52. By operating the servo motor 82, the pusher element 70 is advanced towards the free end of the hanger 36 at the A position. This causes a force to be produced on the trailing belt 9 which urges the belts, each against the other and toward the free end of the hanger 36, so that the belt 9 closest to the free end of the hanger 36 is urged into the standby position on the standby portion 50. The pusher element 70 is repeatedly operated in this fashion to advance the belts an incremental distance equal to a belt width to place the belts one-by-one in the standby position.

The gripping jaws 68 are situated to grasp a belt 9 in the standby position. Lowering of the gripping jaws 68 is effected by operating the cylinder 92. The chuck 84 moves the gripping jaws 68 together to grasp the belt in the standby position. The gripping jaws 68 are then elevated by reverse operation of the cylinder 92. The cylinder 90 is then operated to direct a belt 9 held by the gripping jaws 68 from the standby position towards one of the belt running units 18, 20 that is in the attaching/detaching position. For purposes of this explanation, the belt running unit 18 will be considered to be in the attaching/detaching position.

By operating the cylinder 96, the belt 9 held by the gripping jaws 68 can be moved towards the drive pulley 98 and eventually to a position around the drive pulley 98. The belt 9 can then be released to be supported by the drive pulley 98. Vibration of the belt extending around the drive pulley 98 is attenuated by a shield plate 178 having a vertically extending surface 180 adjacent the mounted belt 9. The shield plate 178 facilitates belt mounting. The driven pulley 100 is then moved downwardly to set the tension on the belt 9 surrounding the drive and driven pulleys 98, 100.

As this is taking place, the second belt running unit 20 is performing a processing step, i.e. polishing a belt 9. Upon completion of the processing step, the second belt running unit 20 is pivoted through 90° from the processing position to the attaching/detaching position therefor. As this is occurring, the first belt running unit 18, with the belt 9 mounted thereon, is pivoted 90° from the attaching/detaching position to the processing position.

The processing units 128, 128' are then advanced towards each other to bear the sanding belts 132, 132' against the belt side surfaces S1, S2. Compressed air is delivered through a conduit 184 from the center of the driven pulley 100 towards the bottom of the belt 9 which is being polished, to thereby remove powder adhered thereto.

Once the second belt running unit 20 is moved from the processing position to the attaching/detaching position, the driven pulley 100' is raised to release tension on the belt 9 mounted thereon. The guide plate 112' is then rotated from the retracted position to the extended position to raise the belt above the drive pulley 98'.

The raised belt 9 is then engaged by the gripping jaws 68 on the belt transfer assembly 16, which deposits the completed belts on one of the rods 156, 158 on the plate 152 for collection and storage therearound.

By polishing the belt side surfaces S1, S2, as described, side surfaces which have recesses, protrusions, and projecting reinforcing fibers, may be run with less noise generation.

The foregoing disclosure of specific embodiments is intended to be illustrative of the broad concepts comprehended by the invention.

What is claimed is:

1. An apparatus for repositioning and forming a power transmission belt, said apparatus comprising:

first and second hangers for supporting a plurality of power transmission belts and movable selectively from an inactive position into an active position, each of the first and second hangers having a storage portion and a standby portion;

at least one shifting mechanism which is operable to move a power transmission belt at the storage portion to the standby portion on each of the first and second hangers;

a first belt running unit having a first pulley around which a power transmission belt can be placed, the first belt running unit being movable selectively between a processing position and an attaching/detaching position;

a second belt running unit having a second pulley around which a power transmission belt can be placed, the second belt running unit being movable selectively between a processing position and an attaching/detaching position;

at least one belt transfer assembly which is operable to move a power transmission belt at the standby portion on one of the first and second hangers that is in the active position for the one of the first and second hangers to around one of the first and second pulleys with the belt running unit having the one of the first and second pulleys located in the attaching/detaching position therefor; and a processing assembly for forming a part of a power transmission belt with a power transmission belt placed around one of the first and second pulleys.

2. The apparatus for repositioning and forming a power transmission belt according to claim 1 further comprising a storage assembly for collecting power transmission belts after forming by the processing assembly.

3. The apparatus for repositioning and forming a power transmission belt according to claim 2 wherein the at least one belt transfer assembly is operable to move power transmission belts after forming by the processing assembly to the storage assembly.

4. The apparatus for repositioning and forming a power transmission belt according to claim 2 wherein the storage assembly comprises a plate with a first rod projecting from the plate and around which power transmission belts can be placed.

5. The apparatus for repositioning and forming a power transmission belt according to claim 4 wherein the storage assembly comprises a second rod projecting from the plate and around which power transmission belts can be placed.

6. The apparatus for repositioning and forming a power transmission belt according to claim 4 wherein the plate and first rod are movable together around an axis.

7. The apparatus for repositioning and forming a power transmission belt according to claim 1 further comprising at least a third pulley around which a power transmission belt placed around one of the first and second pulleys can be simultaneously placed with the belt running unit having the one of the first and second pulleys located in the processing position therefor.

8. The apparatus for repositioning and forming a power transmission belt according to claim 7 wherein at least one of the first pulley and the third pulley is movable relative to the other of the first pulley and the third pulley to adjust tension on a power transmission belt placed around the first and third pulleys.

9. The apparatus for repositioning and forming a power transmission belt according to claim 1 wherein the first and second hangers are carried on a frame and the frame is movable around a first axis to selectively change the first and second hangers between the active and inactive positions therefor.

10. The apparatus for repositioning and forming a power transmission belt according to claim 9 wherein the first and second hangers project in cantilever fashion from the frame.

11. The apparatus for repositioning and forming a power transmission belt according to claim 9 further comprising a drive which is operable to move the frame around the first axis.

12. The apparatus for repositioning and forming a power transmission belt according to claim 1 wherein the at least one belt transfer assembly is operable to move a power transmission belt in paths along multiple, transverse axes.

13. The apparatus for repositioning and forming a power transmission belt according to claim 1 further comprising a plurality of power transmission belts with pulley-engaging sides arranged side-to-side surrounding the first hanger and the at least one shifting mechanism comprising a pusher element which is engageable with one of the power transmission belts and movable to cause the one of the power transmission belts to move another power transmission belt surrounding the first hanger from the storage portion to the standby portion.

14. The apparatus for repositioning and forming a power transmission belt according to claim 1 wherein the belt running units are each pivotable between the processing and attaching/detaching positions therefor.

15. The apparatus for repositioning and forming a power transmission belt according to claim 14 further comprising a drive for moving the first belt running unit pivotably through 90° between the processing position and attaching/detaching position for the first belt running unit.

16. The apparatus for repositioning and forming a power transmission belt according to claim 1 wherein the processing assembly comprises a polishing element for polishing a surface of a power transmission belt.

17. The apparatus for repositioning and forming a power transmission belt according to claim 1 including a drive that is operable to cause a power transmission belt placed around the first pulley to move in an endless path while being formed by the processing assembly.

18. The apparatus for repositioning and forming a power transmission belt according to claim 1 wherein the first hanger has a stabilizing element thereon defining first and second spaced edges for supporting a power transmission belt surrounding and supported on the first hanger.

19. The apparatus for repositioning and forming a power transmission belt according to claim 18 wherein the stabilizing element has a C shape in cross section.

20. The apparatus for repositioning and forming a power transmission belt according to claim 1 wherein the at least one shifting mechanism comprises a pusher element that is movable in first and second transverse paths.

21. The apparatus for repositioning and forming a power transmission belt according to claim 1 wherein the belt transfer assembly comprises first and second jaws that are movable selectively towards and away from each other to selectively grip and release a power transmission belt.

22. The apparatus for repositioning and forming a power transmission belt according to claim 17 wherein the first and second jaws are movable along three transverse axes.

23. The apparatus for repositioning and forming a power transmission belt according to claim 1 further comprising a conduit for directing a supply of pressurized air against a power transmission belt placed around the first pulley with the first belt running unit in the processing position for the first belt running unit.

24. The apparatus for repositioning and forming a power transmission belt according to claim 1 further comprising a shield plate having a vertically extending surface adjacent to a power transmission belt placed around the first pulley with the first belt running unit in the processing position for the first belt running unit to thereby reduce vibration of a power transmission belt moving in an endless path around the first pulley.

25. An apparatus for repositioning and forming a power transmission belt, said apparatus comprising:
a first belt running unit having a first pulley around which a power transmission belt can be placed,
the first belt running unit being movable selectively between a processing position and an attaching/detaching position;
a second belt running unit having a second pulley around which a power transmission belt can be placed,
the second belt running unit being movable selectively between a processing position and an attaching/detaching position;
at least one belt transfer assembly which is operable to move a power transmission belt to around one of the first and second pulleys with the belt running unit having the one of the first and second pulleys located in the attaching/detaching position therefor; and
a processing assembly for performing a processing step on a power transmission belt with a power transmission belt a) placed around the first pulley on the first belt running unit in the processing position for the first belt running unit and b) placed around the second pulley with the second belt running unit in the processing position for the second belt running unit,
whereby with the first belt running unit in the processing position for the first belt running unit and the second belt running unit in the attaching/detaching position for the second belt running unit, the processing assembly can perform a processing step on a power transmission belt placed around the first pulley, whereby upon completion of the processing step on the power transmission belt placed around the first pulley the first belt running unit can be moved to the attaching/detaching position for the first belt running unit and the second belt running unit can be moved to the processing position for the second belt running unit to allow the processing assembly to perform a processing step on a power transmission belt placed around the second pulley.

26. The apparatus for repositioning and forming a power transmission belt according to claim 25 further comprising at least a third pulley and a power transmission belt can be simultaneously placed around the first and third pulleys with the first belt running unit in the processing position therefor.

27. The apparatus for repositioning and forming a power transmission belt according to claim 26 wherein at least one of the first pulley and third pulley is movable relative to the other of the first pulley and the third pulley to adjust tension on a power transmission belt placed around the first and third pulleys.

28. The apparatus for repositioning and forming a power transmission belt according to claim 25 further comprising a belt transfer assembly which is operable to move a power transmission belt to around the first pulley.

29. The apparatus for repositioning and forming a power transmission belt according to claim 28 wherein the belt transfer assembly is operable to move a power transmission belt from around the first pulley.

30. The apparatus for repositioning and forming a power transmission belt according to claim 25 wherein the processing assembly comprises a polishing element for operating on a surface of a power transmission belt.

31. An apparatus for repositioning and forming a power transmission belt, said apparatus comprising:
first and second hangers for supporting a plurality of power transmission belts, the first and second hangers mounted to a frame for rotation around a first axis to selectively place each of the first and second hangers in active and inactive positions,
each of the first and second hangers having a storage portion and a standby portion;
a drive which is operable to move the frame around the first axis;
a first belt running unit having a first pulley around which a power transmission belt can be placed,
the first belt running unit being movable selectively between a processing position and an attaching/detaching position;
a second belt running unit having a second pulley around which a power transmission belt can be placed,
the second belt running unit being movable selectively between a processing position and an attaching/detaching position;
at least one belt transfer assembly which is operable to move a power transmission belt at the standby portion on one of the first and second hangers that is in the active position for the one of the first and second hangers to around one of the first and second pulleys with the belt running unit having the one of the first and second pulleys located in the attaching/detaching position therefor,
the at least one belt transfer assembly capable of moving a power transmission belt along multiple transverse axes;
a drive that is operable to move each of the first and second belt running units between the processing and attaching/detaching positions therefor;
a processing assembly for forming a part of a power transmission belt with a power transmission belt placed around one of the first and second pulleys; and
a storage assembly for collecting power transmission belts after forming by the processing assembly.

32. The apparatus for repositioning and forming a power transmission belt according to claim 31 wherein the first and second belt running units are each pivotable between the processing and attaching/detaching position therefor.

33. A method of repositioning and forming a power transmission belt, said method comprising the steps of:
storing a plurality of power transmission belts on a first hanger;

transferring a first power transmission belt from the first hanger to around a first pulley on a first belt running unit in a processing position;

moving the first power transmission belt around the first pulley;

as the first power transmission belt is moving around the first pulley performing a processing step on the first power transmission belt through a first processing assembly;

repositioning the first belt running unit from the processing position into an attaching/detaching position;

transferring the first power transmission belt from around the first pulley to a storage location after performing the processing step;

with the first belt running unit in the attaching/detaching position, moving a second belt running unit with a second pulley and a second power transmission belt placed around the second pulley from an attaching/detaching position for the second belt running unit to a processing position for the second belt running unit;

with the second belt running unit in the processing position for the second belt running unit, moving the second power transmission belt around the second pulley;

performing a proessing step on the second power transmission belt through the first processing assembly with the second power transmission belt moving around the second pulley;

repositioning the second belt running unit from the processing position for the second belt running unit into the attaching/detaching position for the second belt running unit;

placing a third power transmission belt from around the first hanger to around the first pulley; and repositioning the first belt running unit with the third power transmission belt around the first pulley to the processing position for the first belt running unit to allow performance of a processing step on the third power transmission belt.

34. The method of repositioning and forming a power transmission belt according to claim 33 further comprising the steps of providing a second hanger and moving the first and second hangers selectively from an inactive position to an active position from where power transmission belts on the first and second hangers can be transferred to the first and second pulleys.

35. The method of repositioning and forming a power transmission belt according to claim 33 including the step of shifting a plurality of power transmission belts on the first hanger to move individual power transmission belts from a storage portion of the first hanger to a standby portion of the first hanger.

* * * * *